UNITED STATES PATENT OFFICE.

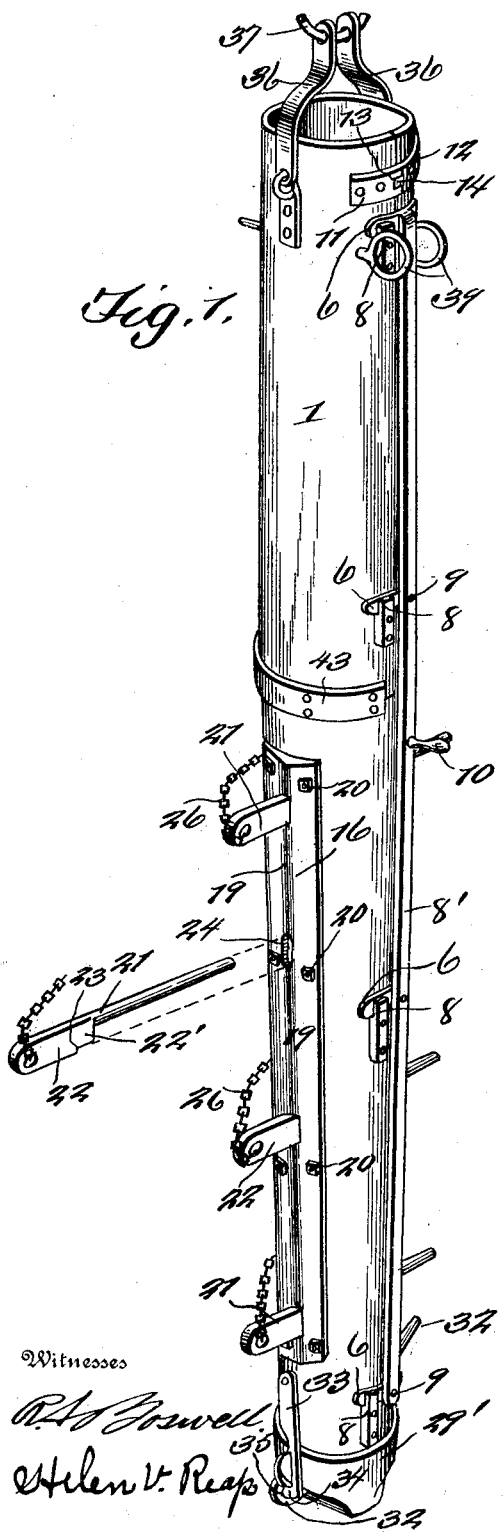
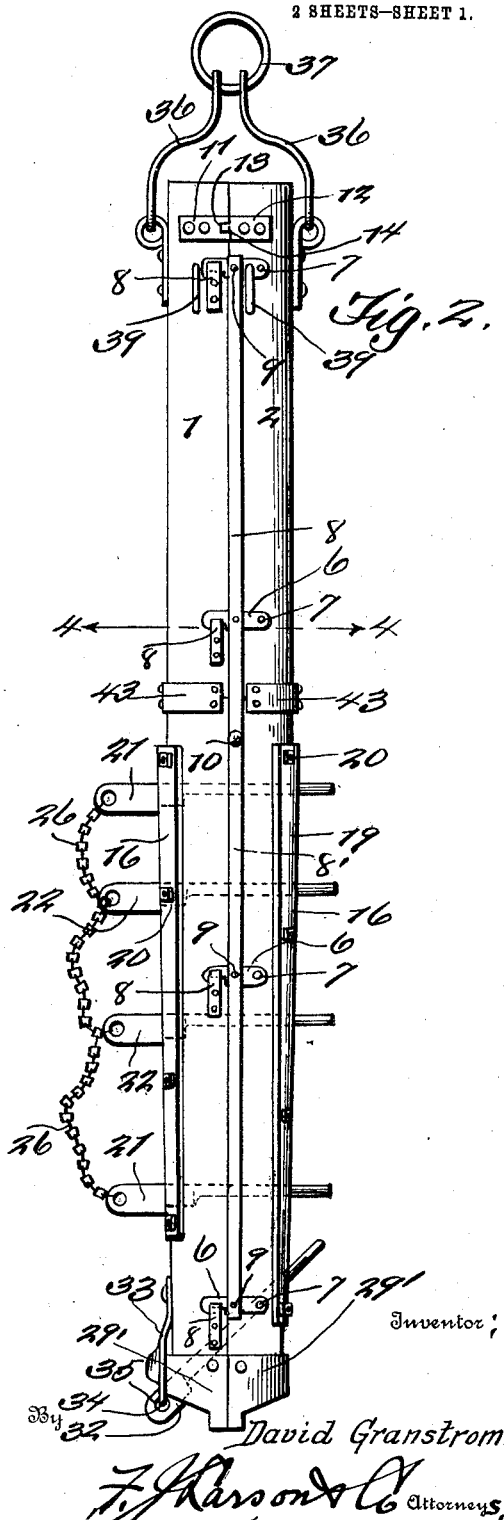

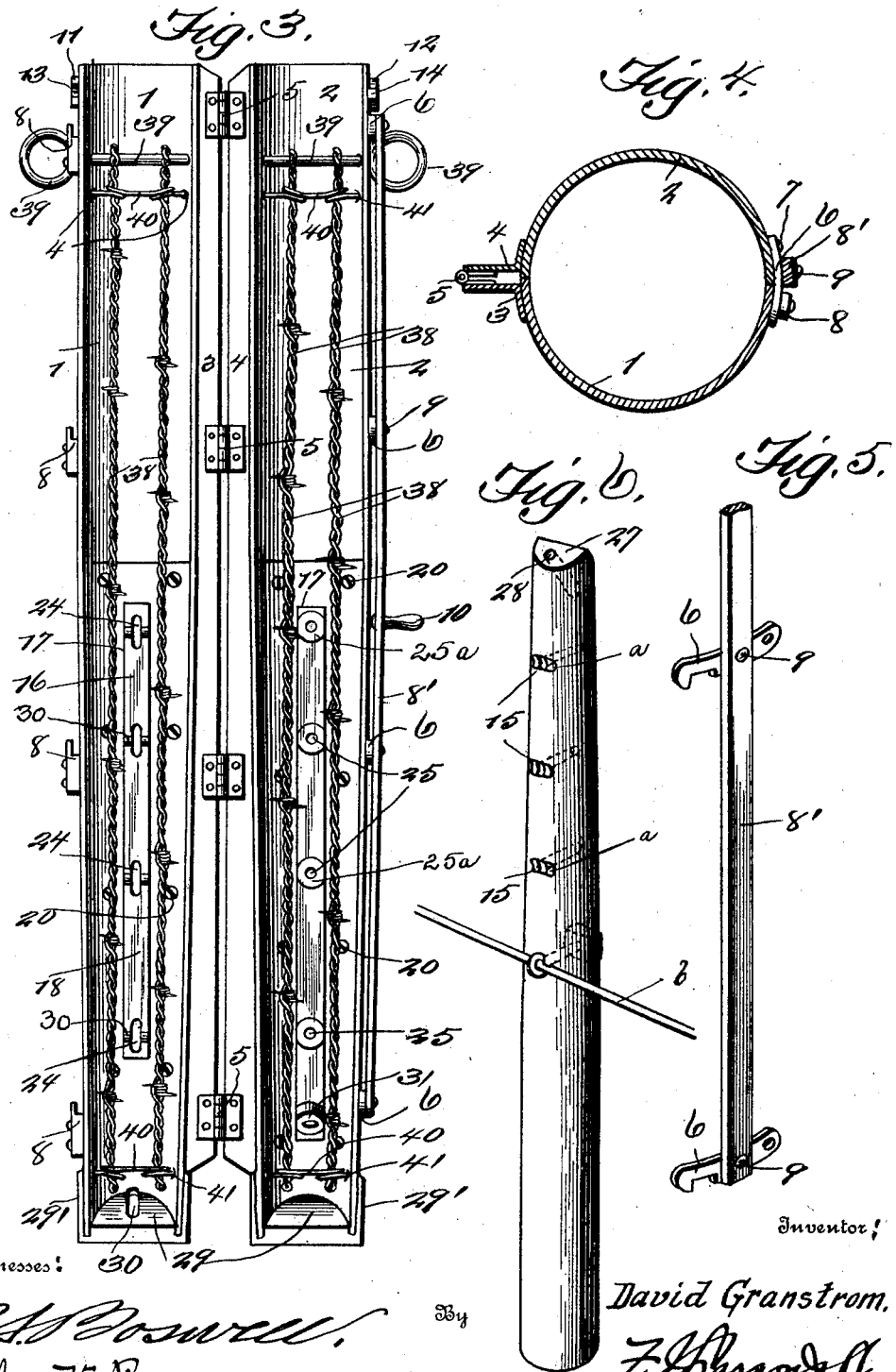

DAVID GRANSTROM, OF OMAHA, NEBRASKA.

MOLD.

996,983.  Specification of Letters Patent.  Patented July 4, 1911.

Application filed March 19, 1908. Serial No. 422,001.

*To all whom it may concern:*

Be it known that I, DAVID GRANSTROM, a citizen of the United States, residing at Omaha, in the county of Douglas, State of Nebraska, have invented certain new and useful Improvements in Molds, of which the following is a specification.

My invention pertains to improvements in molds and relates more particularly to fence post molds.

The object of my invention is to improve, simplify and generally increase the efficiency of this type of mold.

A further object of the invention is to provide means which will readily adapt the mold to the formation of fence posts embodying provision for varying the numbers of horizontal wires employed.

Further objects of the invention will appear in the course of the following specification.

Referring to the accompanying drawings wherein like characters of reference denote similar parts throughout the several views:—Figure 1, is a perspective view showing the mold in closed position, Fig. 2, is a side elevation, Fig. 3, is a similar view showing the mold in open position, Fig. 4, is a horizontal section on line 4—4 of Fig. 2, Fig. 5, is a fragmentary view in perspective of the locking hooks and actuating bar thereof, and Fig. 6, is a perspective view of a fence post molded in my improved mold.

A mold constructed in accordance with my invention embodies two sections 1, and 2, each semi-circular in cross-section and formed with a gradual taper which diminishes as the apex of the mold is reached. Secured to each section, adjacent their abutting longitudinal edges are angle irons 3, and 4, which extend approximately the length thereof and which have their webs spaced apart to fixedly receive hinges 5, on their inner faces, whereby a hinge connection between the members is formed which when closed as shown in Fig. 4, enables the abutting edges of the sections to closely engage and form a tight joint to prevent the egress of the plastic material. The opposite longitudinal edges of the sections are locked preferably by a plurality of hooks 6, pivoted at 7, to section 2, and having their free engaging ends extending over to section 1, to engage with keepers 8, provided on the latter. Inasmuch as a plurality of hooks are employed disposed along the length of the sections I use a longitudinal actuating bar 8', pivoted to each hook at 9, approximately central of the length of each hook, and provide this bar 8', with a finger knob 10, which when moved longitudinally of the mold operates all of the hooks in unison to either closed or open position as is manifest.

At the base of the mold, alining means are provided which consists of short strips of metal 11, 12, secured to sections 1, and 2 respectively, 11, having an opening 13, which receives a contracted extension 14, of 12, the said parts when in engagement thus assuring against any independent longitudinal movement of the sections with respect to each other.

An important feature of my invention resides in the means for sustaining the cores in position, it being understood that in this art, as shown in Fig. 6, the post is molded with a series of transverse bolt receiving openings 15, the number of which openings and distances apart at which the openings are placed being governed by the number of horizontal wire strands the fence is to be constructed with, which varies in use, as is commonly known. To readily enable the number to be changed as desired I have provided removable core plates 16, of rectangular form which are let into side openings 17, formed at diametrically opposite points in sections 1 and 2. These core plates on their faces 18, closely fit the walls formed by openings 17, and as shown in Figs. 1 and 2, are of greater area than said openings 17, on their outer faces 19, so as to extend beyond the openings, and are removably secured to the sections by bolts and nuts 20. It is thus apparent that by providing an equipment of core plates which are formed with varying numbers of core receiving openings, the post may be molded with as many bolt openings as may be necessitated by its use. The cores 21, as shown in Figs. 1 and 2, are constituted of elements formed at their outer ends with enlarged parts 22, somewhat rectangular in cross-section and provided with a slight reduced portion 22', which provides shoulders 23, for engagement with the faces 19, of core plates 16, to thereby restrict the inward movement of the cores. Beyond reduced portion 22', the cores are preferably circular in cross section forming pin-like extensions which are of a size to readily permit the insertion of the bolt fastenings of the fence wires. One of the core plates is formed with openings 24, to snugly receive reduced portions 22', of the cores, and the opposite plate with openings 25, to snugly receive the core pin extensions. Chains 26, if desired, may be attached to the cores to prevent the loss of the same.

As shown in Fig. 6, the post is of a peculiar type in that its crown is oppositely tapered or beveled as at 27, the crown being penetrated by inclined bolt opening 28, which thereby makes it possible to secure a horizontal strand of wire on said crown. To provide for the formation of this oppositely tapered crown and the crown opening I form the crown of the mold sections with caps 29', having enlarged parts 29, beveled on their inner faces and one which is diagonally formed with an opening 30, at the inclination depicted in Fig. 2, the core plate of section 2, being formed with an inward perforated boss 31, on an extension of the core plate of section 2, which boss receives the pin extension of the crown core 32. To lock the crown core in position I provide a pivoted hook 33, pivoted to section 1, and which has its hook end 34, of a size to enter the eye 35, of core 32.

In practice the molds after being filled are suspended from cables (not shown) until the plastic composition has become thoroughly hardened and to this end I equip each mold section with swingable curved suspending arms 36, the free ends of which are secured to a ring 37, through which the cable or the like is passed. Thus the molds are suspended with their crowns in lowermost position which makes necessary the core securing means for core 32, heretofore described.

In fence post construction involving the use of plastic composition, strengthening and binding wires are employed which are molded in the post. These wires are shown at 38, there being four employed, which are suspended from the base of the mold by means of removable pins 39, which receive eyes formed in wires 38, for this purpose. To secure wires 38, in their determinate relation during the molding process transverse connecting wires 40, are used which are securely affixed to each of wires 38, and may engage in pricked depressions 41, formed in the inner faces of the mold sections. In cases where the individual mold sections are formed of two sections of metal, I use transverse strips 43, which cover the joint and securely relate the parts.

In order to mold the front face of the posts with depressions $a$, at the points where the fence wires $b$, engage with the posts, I provide one of the core plates with pairs of curved projections 30, on opposite sides of each opening 24, thereof and the other core plate with inwardly extending bosses $25^a$, which are perforated to receive the cores and which are of such size to form depressions in the rear face of the post sufficiently large to receive the nuts of the securing bolts.

Having thus fully described my invention, what I claim as new and desire to secure by Letters Patent is:—

A mold comprising two hinged sections each of which are provided with a side opening, a removable core receiving plate received in each of said openings, one of said plates having core-receiving openings therein and the other perforated core-receiving bosses, the crowns of one of said sections having a core receiving opening therein, one of said cores being diagonally disposed and extending through said opening of the crown and into one of said bosses, and a longitudinal actuating bar for locking said sections.

In testimony whereof I have signed my name to the specification in the presence of two subscribing witnesses.

DAVID GRANSTROM.

Witnesses:
  GRACE M. ROWLAND,
  FREDK. J. LARSON.

---

Copies of this patent may be obtained for five cents each, by addressing the "Commissioner of Patents, Washington, D. C."